L. C. SHARP.
METHOD AND MEANS FOR MAKING CUP PASTRY.
APPLICATION FILED JUNE 12, 1919.
1,416,889.
Patented May 23, 1922.
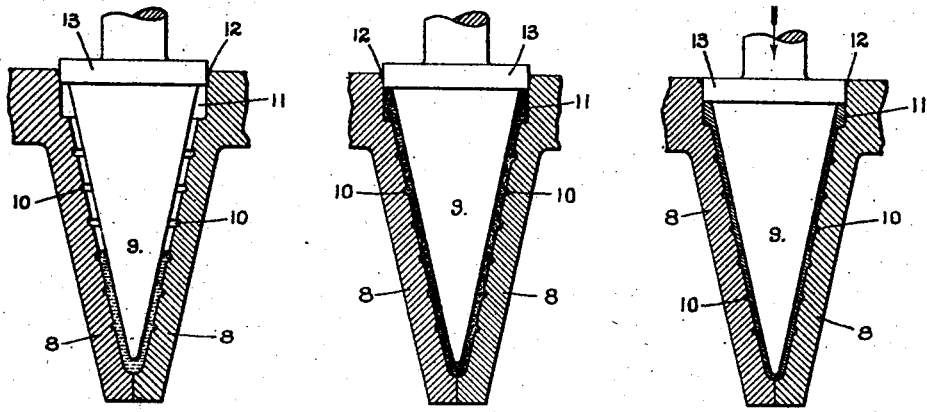
Fig. 1.   Fig. 2.   Fig. 3.
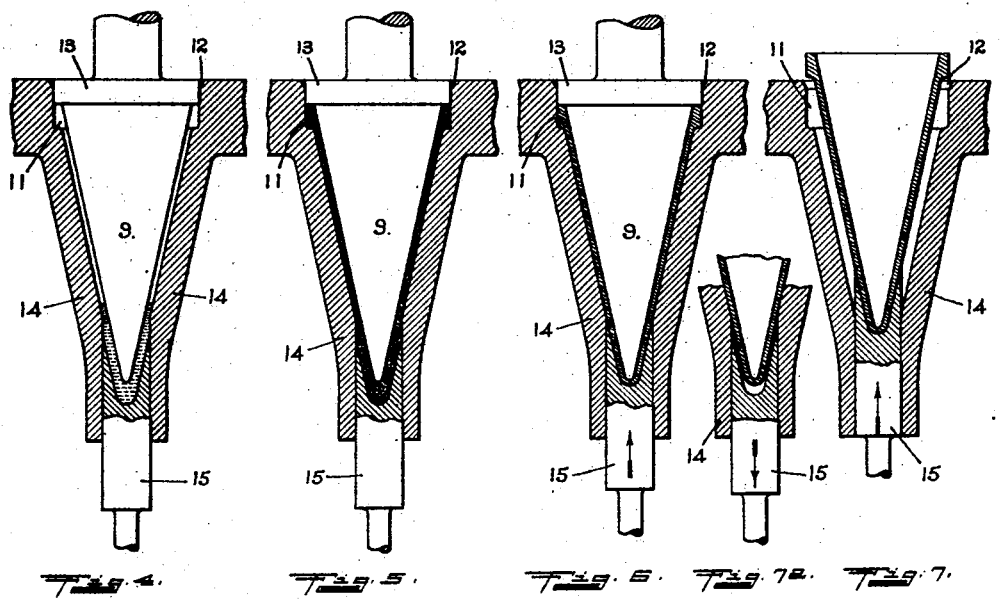
Fig. 4.   Fig. 5.   Fig. 6.   Fig. 7ª.   Fig. 7.
Inventor.
L. C. Sharp,
By David O. Barnell,
Attorney.
Witness:
A. W. Jamieson.

UNITED STATES PATENT OFFICE.

LEE C. SHARP, OF PLATTSMOUTH, NEBRASKA, ASSIGNOR, BY MESNE ASSIGNMENTS, TO ALEXANDER McLAREN, OF DAYTON, OHIO.

METHOD AND MEANS FOR MAKING CUP PASTRY.

1,416,889.  Specification of Letters Patent.  Patented May 23, 1922.

Application filed June 12, 1919. Serial No. 303,767.

*To all whom it may concern:*

Be it known that I, LEE C. SHARP, a citizen of the United States, and a resident of Plattsmouth, in the county of Cass and State of Nebraska, have invented certain new and useful Improvements in Methods and Means for Making Cup Pastry, of which the following is a specification.

My invention relates to the art of manufacturing cup pastry, such as the well-known cups, horns or hollow cones used for dispensing ice-cream and like materials. Pastry of this character is now generally baked in suitable molds having cores for shaping the interior of the hollow product, the unbaked material being a thin and substantially fluid batter which during the baking operation is changed to a plastic, pasty or semi-fluid condition, and gradually becomes harder until at the conclusion of the baking the article has sufficient solidity to enable its removal and to retain its form when removed from the mold. In the commercial production of the pastry cups on a large scale, the mold-parts are heated constantly, or substantially so, and when the batter is introduced into the heated mold the first effect of the heating of the batter is a very marked increase in the volume thereof, due to the formation of steam from the liquid therein, and to the evolution of gas when leavening materials are included in the batter mixture. The maximum volume of the material is reached at the end of approximately one-fourth of the entire baking period, the material becoming doughy and plastic and continuing in this state until the baking is substantially completed, and there being a gradual decrease in volume of the material during that part of the baking period following the first or expansion period above mentioned. Owing to the changes of volume of the material during baking, some of the most serious problems encountered by manufacturers of cup pastry have been to produce perfectly formed and uniformly baked cones, and to avoid waste of material due to overflowing of the molds during the initial or expansion period of the baking. The shrinkage of the material during the final part of the baking period results in the molds being imperfectly filled, so that the product will have a shrunken or wrinkled and corrugated appearance, with the surface unevenly baked or browned, owing to the shrunken portions being drawn out of contact with the heated walls of the mold-cavities. The shrinking of the material also results in the walls of the cones being of uneven thickness. In the molds commonly provided for baking pastry of this class, the capacity or volume of the mold-cavity remains constant after the mold is closed, and, to insure as nearly as possible that the mold-cavity will be completely filled with the material, it is customary to introduce into the mold a quantity of batter which when fully expanded is more than sufficient to fill the mold-cavity. Then, during the initial expansion of the batter, such excess material is forced out of the mold, which for this purpose is left partly open during the expansion period, or is provided with openings or vents through which the overflow may occur. The excess or overflow material is thus wasted, and a further disadvantage results from the projections or fins which are left upon the cones at the completion of the baking, and which must be removed by subsequent trimming operations. Furthermore, even after the introduction of an excess of batter into the molds, the same are imperfectly filled at the conclusion of the baking, owing to the shrinkage of the material during the final stage of the baking operation.

It is the object of my invention to overcome the difficulties and disadvantages above explained, and to provide a method or process and means for making cup pastry of the class described, whereby all waste of the material may be avoided, and whereby the baked product may completely fill the mold-cavity, so that all surfaces of the cups or cones may conform perfectly to the shape of the mold and thus be of uniform thickness, uniformly baked, and without wrinkles or shrunken spots.

In the accompanying drawings I have illustrated diagrammatically two ways in which the essential operations of my method or process may be effected, together with the necessary means or apparatus for carrying out the process, and, referring to said drawings,—

Fig. 1 is an axial section of a split or divided mold with fluid batter therein, as when said material is first introduced to the mold-cavity and the mold closed by the entry of the core-head into the mouth of the mold-cavity.

Fig. 2 is a similar view with the material fully expanded and assuming the plastic, pasty or doughy condition characteristic thereof during the intermediate portion of the baking period.

Fig. 3 is a similar view with the material fully baked and set or hardened sufficiently to be removed from the mold, and with the volume of the mold-cavity reduced by lowering of the core to compensate for the shrinkage of the material during the final portion of the baking period.

Fig. 4 is an axial section of a mold of the kind usually designated as a solid or undivided mold, but provided with a movable plunger at the apex of the cavity, the mold having fluid batter therein as when first introduced and the mold closed by the entry of the core-head into the mouth of the cavity.

Fig. 5 is a similar view showing the material expanded and assuming the plastic condition.

Fig. 6 is a similar view showing the material fully baked and ready for the opening of the mold.

Fig. 7 is a similar view showing the mold opened by the withdrawal of the core, and the baked product partially ejected by elevation of the movable plunger.

Fig. 7ª is a partial or fragmentary view showing an intermediate operation which may be performed optionally, prior to opening of the mold, for the purpose of detaching the movable plunger from the baked product.

In carrying out my invention it is necessary that a mold be provided of such character that the volume or capacity of the mold-cavity may be varied during the baking of the pastry product therein, after the mold has been effectively closed so as to permit only the escape of gas or steam therefrom. Obviously a mold of this character may be constructed in various ways, and I have shown in the drawings two suitable arrangements of the mold-parts, with either of which the baking of hollow pastry cones may be effected in accordance with my method or process.

Referring first to the mold structure shown in Figs. 1, 2 and 3, the mold is of the split or divided form, the main body or female part thereof being in symmetrical halves 8 each containing a semi-conical cavity, and said halves or parts being juxtaposed on opposite sides of a plane extending through the axis of the conical cavity as a whole. There is also provided in said mold structure a conical core 9 having the same taper as the walls of the cavity, whereby when said core is introduced into the cavity coaxially therewith the conical surface of the core will be equidistant at all points from the conical wall-surfaces of the female part, regardless of the depth to which the core is inserted in the cavity. The female mold-parts 8 may be mounted in any suitable manner, such as is well known in the art, for relative movement from and toward each other to facilitate the removal of the baked product from the cavity, and circumferential grooves 10 may be provided in the inner conical wall, as shown, for the purpose of retaining the baked pastry during the withdrawal of the core therefrom. The mold, in the above mentioned respects, is substantially the same as the molds now commonly used for the production of pastry cones. It will be particularly noted, however, that the upper portion of the mold has a cylindrical counterbore 11 extending to a considerable depth below the upper surface of the mold-body, the upper end of said counterbore being outwardly beveled or chamfered as shown at 12, and the core 9 being provided with a cylindrical piston-like head-portion 13 adapted to fit slidably within the counterbore and to be guided into the counterbore by the chamfered edge 12 as the core is inserted into the cavity. The fit of the core-head 13 within the counterbore 11 is such that when said head is entered therein the conical body of the core is properly centered or brought into coaxial relation with the conical cavity, but so that relative movement of the male and female parts is freely permitted. An ordinary sliding fit of the cylindrical parts is found to be sufficient to permit the escape from the cavity of the steam or other gaseous products evolved from the batter during the baking operation, but insufficient to enable the formation of an appreciable fin or projection upon the baked cone, even if there should be considerable pressure tending to force the baking material through the joint around the core-head. It is not the intention, however, to so operate the mold that more than a merely nominal pressure will be exerted within the mold-cavity, especially during the initial part of the baking period and before the batter has assumed the plastic and semi-solid condition which is reached substantially at the same time as its maximum expansion.

In the operation of the described mold in accordance with my method or process, a suitable measured quantity of the fluid batter is introduced into the mold-cavity, the mold-parts 8 being juxtaposed and held together, and the core being completely withdrawn at a time prior to said introduction of the batter; and thereafter the core is inserted into the cavity until the head 13 has partially entered the counterbore 11. The mold is thus closed, the conical core centered within the cavity, and the parts are in substantially the relative positions shown in Fig. 1. Any suitable means may be employed for heating the mold to baking temperature, it being obvious that, should the mold be merely one unit of an organized machine adapted for quantity production of pastry cones, the mold parts would be heated more or less constantly and thus be substantially at a baking temperature when the batter is introduced. It will be equally obvious, however, that a limited number of the molds, or single molds, may be operated entirely by hand, and heated by being placed within an oven, or in any other manner. After the introduction of batter and closing of the mold as shown in Fig. 1, and upon the application of a proper degree of heat thereto, the batter expands so as to completely fill the mold cavity, as shown in Fig. 2. By a proper proportioning of the quantity of batter to the capacity of the mold, the batter when at maximum expansion will just fill the mold cavity, with the core at the initial closing position shown in Figs. 1 and 2, without causing pressure within the cavity more than enough to cause the escape of steam or evolved gaseous products, through the joint around the core-head. Any reasonable excess in the quantity of the batter may be accommodated, however, by raising of the core to thereby enlarge the capacity of the mold-cavity and thus permit the expansion of the material without causing overflow. Should the charge of batter be slightly less than the normal or standard charge, so that when fully expanded it will not fill the cavity with the core at the first described position, the deficiency is compensated during the final part of the baking operation. During this phase of the operation the core is pushed down farther into the mold-cavity, as represented in Fig. 3, thus reducing the capacity of the cavity and proportioning the same to the shrinkage of the baking charge, whereby the baking material is kept constantly in contact with the walls of the mold and the finished product will have the exact form of the mold and be uniformly baked over its entire surface. It will be seen that the only difference in the baked cones resulting from moderate variations of the batter charge will be a slight difference in the thickness of the walls of the cones, and that such difference, being uniform throughout, will be substantially inappreciable. Owing to the plastic condition of the material, which continues, as before mentioned, until substantially the completion of the baking operation, the material can flow from one part of the cavity to another and thus fill out any hollow spaces which might exist momentarily in any part of the cavity from any cause, such as an excessive local evolution of gas or steam; and it will be seen that such flow and redistribution of the plastic material will be caused to occur by the pressure of the descending core upon such parts of the material as are already filling the radial space between the core and the outer wall of the mold.

After the completion of the baking operation the mold is opened by withdrawing the core and separating the mold-parts 8, and the baked cone removed from the mold, all in the usual manner well known in the art.

Referring now to the mold structure shown in Figs. 4, 5, 6, 7 and 7ª, the mold is of the so-called solid or undivided type, the main body 14 of the female portion being integral. The mold-body 14 is provided at its upper end with the cylindrical counterbore 11 and chamfer 12, as in the form first described, and the core 9 and core-head 13 may also be identical with that of the first form. The conically bored portion of the body 14 is not provided with the grooves 10, as the same would interfere with the ejection of the product therefrom. The lower portion of the body 14 is bored to receive slidably a cylindrical plunger 15, and the upper end of said plunger has therein a conical recess which forms a part of the mold-cavity. The sides of said recess have the same inclination to the axis of the cavity as the sides of the portion of the cavity formed in the main body 14, so that when said sides are placed in register by a proper positioning of the plunger, as shown in Fig. 6, the form of the mold-cavity as a whole is the same as in the mold first described. For convenience of description, the position of the plunger 15 shown in Fig. 6 will be designated as the normal position, and positions thereof below and above said position, as shown respectively in Figs. 5 and 7, will be designated as lowered and raised positions.

In the use of the described mold, the same is opened by complete withdrawal of the core, and the plunger 15 is held in lowered position during the introduction of the batter and during the initial or expansion phase of the baking period. After introduction of the batter the core is inserted to its normal depth, so as to be centered by engagement of the head 13 with the counterbored mouth of the cavity, and also to effect closure of the mold-cavity. At the lowered position of the plunger 15 the mold-cavity has a capacity sufficient to accommodate a normal charge of batter when fully expanded, and the condition at the end of the expansion period is represented in Fig. 5. During the final portion of the baking period the shrinkage of the material is compensated by moving the plunger 15 up to the normal position shown in Fig. 6, which represents the condition at the conclusion of the baking. After the completion of the baking, the mold is opened by completely withdrawing the core, and the baked cone is partially ejected from the mold by moving the plunger 15 to the raised position shown in Fig. 7. At the option of the operator, prior to opening of the mold, the plunger may be lowered as represented in Fig. 7ª, to detach the plunger from the baked cone should the latter tend to adhere to the walls of the recess in the end of the plunger.

In the operation of the mold as above described, all variation of capacity of the mold, to constantly proportion the same to the volume of the baking material, is effected by movements of the plunger 15, which not only serves this purpose but is also used for ejecting the baked product. It will be obvious that in the use of a solid or undivided mold, when so manipulated that there is no overflow of batter from the mold to form a head-sheet, it is necessary to provide means corresponding with the plunger 15 for ejecting the baked cone; and, inasmuch as the use of the undivided mold requires the use of the plunger for ejection, it is deemed preferable to use the same means for varying the capacity of the mold, although the variation of capacity might be effected, in the structure shown, by movement of the core as in the first described form of mold. It is preferable that the core be provided with the piston-like head 13 fitting within the counterbore 11, even though said core be not moved to vary the capacity of the mold-cavity during the baking, in order that the upper end of the baked product may be kept well below the upper surface of the mold-body, and thus be removed from atmospheric influences upon the baking temperature. It will be apparent that the upper end of the cone, being surrounded by a considerable body of heated metal, will be uniformly and thoroughly baked. Also by the use of the piston-like core-head, the length of the joint produced may be such as to effectively prevent extrusion of the batter therethrough, while the fit is loose enough to enable the escape of steam and gases formed during the baking.

With either of the described forms of mold, the closing of the mold, if desired, may be effected somewhat slowly, so that the point of the core will dip into the batter and the same begin to be heated and expanded prior to the actual closing of the mold by the entry of the core-head into the counterbore. This mode of closing the mold permits the escape of some steam and gas from the mold, evolved by heating of the batter, prior to the complete closing of the mold which takes place when the core-head enters the mouth or counterbore. It is deemed preferable, however, to so regulate the quantity of batter introduced into the mold-cavity that the mold may be closed quickly, and substantially the entire expansion of the material occur within the completely closed mold. The term "completely closed" is here used to designate the condition wherein the core-head has entered the counterbore more or less so that escape of material cannot occur therefrom, except as gaseous products may pass through the joint around the piston-like core-head.

It is understood that the particular way of introducing the batter to the mold is not material as any of the common means of standard practice may be employed, as, for instance, pouring the batter charge into the cavity from a can by hand, squirting or pouring it in by pumping or measuring devices, or dipping the core into the batter and then inserting it into the mold cavity, all of which means for introducing the batter are well known in practice.

Now, having described my invention, what I claim and desire to secure by Letters Patent is:

1. In the art of pastry molding and baking wherein is employed heated molds having therein cavities closable by relative movement of the mold-parts; the method of molding and baking the product which consists in partially filling the mold-cavity with unbaked material, closing the mold against escape of the liquid content of the mold, and relatively moving the mold-parts during the baking to vary the volume of the mold-cavity substantially in accordance with changes of volume of the baking material.

2. In the art of cup-pastry molding and baking wherein is employed heated molds and cores relatively movable to open and close the mold-cavities; the method of molding and baking the product which consists in introducing the unbaked material into the mold-cavity while the same is open, closing the mold, and varying the volume of the mold-cavity during the baking and while the mold remains closed proportionally to changes of volume of the baking material, whereby to complete the baking with the material in contact with all surfaces of the mold-cavity.

3. In the art of cup-pastry molding and baking wherein is employed heated molds and cores relatively movable to open and close the mold-cavities; the method of molding and baking the product consisting in introducing batter into the mold-cavity in a quantity sufficient to not more than fill the cavity when said batter is partially baked and at its maximum expansion, closing the mold against escape of batter while permitting escape of steam, and gradually reducing the volume of the mold-cavity during the final portion of the baking period to compensate shrinkage of the baking material.

4. In the art of cup-pastry molding and baking wherein is employed heated molds and cores relatively movable to open and close the mold-cavities; the method of molding and baking the product consisting in introducing the unbaked substantially fluid batter into the mold-cavity while the same is open, closing the mold-cavity against escape of batter by inserting the core into the mold until the core-head is engaged with the mouth of the cavity, holding the core in said position until the batter is fully expanded, and moving the core farther into the cavity during the final portion of the baking period.

5. In the art of pastry molding and baking wherein is employed heated molds comprising separable mold-parts and having cavities therein closable by relative movement of the mold-parts; the method of molding and baking the product consisting in opening the mold-cavity by separation of the mold-parts, introducing fluid batter into the mold-cavity, closing the mold-cavity to prevent the escape therefrom of any but gaseous matter, and relatively moving the mold-parts to reduce the volume of the mold-cavity correspondingly with shrinkage of the baking material after initial expansion thereof.

6. In a mold for cup-pastry, a baking mold body having a blind cavity therein and a passage of uniform section leading into said cavity, and a member fitting in said passage to close the cavity against the escape of batter while permitting the escape of steam, said member being movable to vary the volume of the cavity while the same is kept closed.

7. In the art of cup pastry molding and baking wherein is employed solid molds and cores relatively movable to open and close the mold cavities; the method of molding and baking the product consisting in introducing batter into the mold cavity in a quantity sufficient to not more than fill the cavity when said batter is partially baked and at its maximum expansion, closing the mold against escape of batter while permitting escape of steam, and gradually reducing the volume of the mold cavity during the final operation of the baking period.

8. The method of manufacturing cup pastry which consists in confining a charge of batter in a substantially liquid tight chamber of greater volume than the volume of the batter charge, applying heat to cook the batter while gradually reducing the volume of said chamber to the final capacity and form desired, thereby molding the batter to its final shape and size and baking same in substantial contact with all parts of the mold.

9. The method of manufacturing cup pastry which consists in confining a charge of batter in a substantially liquid tight chamber of greater volume than the volume of the batter charge, applying heat to cook the batter while varying the volume of said chamber to determine the final capacity and form desired, thereby molding the batter to its final shape and size and baking the same in substantial contact with all parts of the mold.

10. The method of making cup pastry in male and female baking molds which consists in introducing batter to the mold, inserting the core into the female mold cavity in a manner which will distribute the batter to the extent desired and closing the mouth of the female mold cavity against the escape of batter while allowing for escape of steam, moving the core toward its final position, allowing the while for the escape of steam, and then, when the steam has approximately all escaped, moving the core to its final position at which the batter assumes the form desired.

11. The method of manufacturing cup pastry which consists in confining a charge of batter in a substantially liquid tight chamber of greater volume than the volume of the finished article to be made, applying heat to cook the batter, reducing the volume of the chamber to the final capacity and form desired while permitting the escape of vaporous fluid, thereby molding the batter to its final shape and size and baking the same.

12. The method of manufacturing cup pastry which consists in taking a female mold and a core adapted to be associated with it to form a molding chamber, introducing batter to the molding chamber, partially introducing the core into the mold cavity and simultaneously closing the molding chamber against the escape of batter while permitting the escape of steam, applying heat to the mold to bake the contents thereof, and causing the core to approach its final position and thereby bring the cubical content of the molding chamber to its final volume.

13. The method of manufacturing cup pastry which consists in taking a female baking mold and a core adapted to be associated with it to form a molding chamber, introducing batter to the molding chamber, partially introducing the core into the mold cavity and closing the molding chamber against the escape of batter while permitting the escape of steam, applying heat to the mold to bake the contents thereof, and causing the core to approach its final position and thereby bring the cubical content of the molding chamber to its final volume.

14. The method of making cup pastry which consists in confining a charge of batter in a substantially liquid-tight chamber of greater volume than the volume of the finished article to be made, applying heat to cook the batter while reducing the volume of said chamber to the final capacity and form desired, permitting the while the escape of steam and restraining the batter against escape, thereby molding the batter to its final shape and size and baking the same.

15. In apparatus of the character stated, a female baking mold having a molding cavity closed except at the mouth of the mold and having a throat between the molding cavity and the mouth of the mold, the diameter of the throat not exceeding the diameter of the adjacent end of the molding cavity, a core adapted to enter and partly fill the molding cavity and including a plug to fit into said throat to close the mold against the escape of batter.

16. In apparatus of the character described, a female baking mold having a cavity provided with a throat at its mouth and a molding or die section beyond the throat, a core element adapted to enter and partially fill the molding cavity, means for plugging the throat before the core has reached its finally seated position against the escape of batter while permitting the escape of steam.

17. In apparatus of the character described, a female baking mold having a cavity closed except at the mouth and provided with a cylindrical portion at its mouth and a molding or die baking section beyond the cylindrical portion, a core element including a core proper and a head adapted to enter the cylindrical portion, close the mouth of the mold to prevent the escape of batter and ensure the central location of the core in the female mold, and means for relieving pressure within the mold cavity during the insertion of the core.

18. In apparatus of the character described, a female baking mold having a molding recess, and a throat between the molding recess and the mouth of the mold, a core adapted to enter and partly fill the molding recess and including a head plug adapted to enter and fit the throat to close the mold against escape of batter while permitting the escape of steam before the core reaches its finally seated position.

19. In apparatus of the character described, a female baking mold having a blind molding recess and a throat between the molding recess and the mouth of the mold, a core adapted to enter and partly fill the molding recess and including a head plug adapted to enter and fit the throat to close the mold against escape of batter, said head having provision for forcing all batter which overflows the molding recess back into the molding cavity upon the complete insertion of the core.

20. An apparatus of the character stated, a female baking mold having a blind molding cavity, and a throat between the molding cavity and the mouth of the mold, the throat being of the same diameter where it joins with the molding cavity as the adjacent part of the molding cavity, a core adapted to enter and partially fill the molding cavity and including a head plug movable with the core which fits the throat and is adapted to close the mold against the escape of batter as the core approaches its finally seated position and before the head plug comes into position at the mouth of the molding cavity.

21. The method of manufacturing pastry which consists in confining a charge of batter in a substantially liquid tight chamber of greater volume than the volume of the batter charge, applying heat to cook the batter while gradually reducing the volume of said chamber to the final capacity and form desired, thereby molding the batter to its final shape and size and baking same.

22. The method of making cup pastry in male and female baking molds which consists in introducing batter to the mold, inserting the male mold into the female mold cavity in a manner which will distribute the batter to the extent desired and closing the mouth of the female mold cavity against the escape of batter while allowing for escape of steam, applying gradual pressure to the male mold to force it toward its final seated position, allowing the while for the escape of steam and then, when the steam has approximately all escaped, forcing the male mold to its final seated position and compressing the batter to the form desired.

23. The method of making cup pastry in male and female baking molds which consists in introducing batter to the molds, inserting the male mold in the female mold to distribute the batter and simultaneously closing the mold against the escape of batter, applying pressure to the male mold to force it toward its final seating position while allowing for the escape of steam and then forcing the male mold to its final seated position compressing the baking batter to the form and size desired.

24. The method of manufacturing cup pastry which consists in taking a female baking mold and a core adapted to be associated to form a molding chamber, introducing batter into the molding chamber, partially introducing the core into the mold cavity and simultaneously closing the molding chamber against the escape of batter while permitting the escape of steam, applying heat to the mold to bake the contents thereof, and causing the core to approach its final position and thereby reduce the cubical content of the molding chamber to its final volume.

25. The method of manufacturing pastry which consists in confining a charge of batter in a substantially liquid tight chamber of greater volume than the volume of the finished article to be made, applying heat to cook the batter, reducing the volume of the chamber to the final capacity and form desired while permitting the escape of vaporous fluid, thereby molding the batter to its final shape and size and baking the same.

26. The method of making cup pastry in male and female baking molds having a molding cavity open at but one place, which consists in introducing a quantity of batter to the mold, introducing the core partially into the female mold cavity and closing the female mold cavity against the escape of batter while providing for the escape of steam and subsequently moving the core to a final position in the mold cavity, allowing the batter to bake until the article has become finished, and then separating the male and female members of the mold and removing the article therefrom.

27. The method of manufacturing cup pastry in male and female baking molds having a molding cavity open at but one place, which consists in introducing a quantity of batter to the mold, then partly introducing the core into the mold cavity and simultaneously closing the entrance of the mold cavity against the escape of batter while permitting escape of steam, gradually projecting the core further into the mold cavity to distribute the batter and subsequently moving the core to a final position in the mold cavity at approximately the time the escape of steam ceases, and allowing the batter to bake until the article has finished and then separating the male and female members of the mold and removing the article therefrom.

28. The method of manufacturing cup pastry in male and female baking molds having a molding cavity open at but one place, which consists in introducing a quantity of batter to the mold, then partially introducing the core into the female mold cavity, closing off the mouth of the female mold cavity against the escape of batter while permitting escape of steam and directing the batter at the mouth of the cavity evenly, then moving the core to a final position at approximately the time the escape of steam has ceased, allowing the batter to bake until the article is finished and then separating the male and female members of the mold and removing the article therefrom.

29. The method of manufacturing cup pastry in male and female baking molds having a molding cavity open at but one place, which consists in introducing a measured quantity of batter to the mold, partly inserting the core into the female mold and simultaneously plugging the entrance of the female mold cavity to restrain the swelling batter and cause it to effect an even distribution as the core is being moved home, allowing the baking and swelling operation to continue and the steam generated to escape from the mold, moving the core to a final position and completing the baking operation and subsequently removing the article from the mold.

30. The method of making cup pastry in male and female baking molds which consists in introducing batter to the mold, inserting the core into the female mold cavity in a manner which will distribute the batter to the extent desired and closing the female mold cavity against the escape of batter while allowing for escape of steam, applying gradual force to the core to move it toward a final position, allowing the while for the escape of steam and then, when the steam has approximately all escaped, moving the core to the final position and shaping the batter to the form desired.

31. The method of making cup pastry in male and female baking molds which consists in introducing batter to the mold, inserting the core into the female mold cavity in a manner to distribute the batter to the extent desired and closing the female mold against escape of batter while allowing for the escape of steam, applying yielding pressure to the core to force it toward a final position, allowing the while for the escape of steam and then moving the core to a final position shaping the batter to the form desired.

32. The method of making cup pastry in male and female making molds which consists in introducing batter to the mold, inserting the male mold in the female mold to distribute the batter, closing the mold against escape of batter, applying movement to the core to carry it toward a final position while allowing for the escape of steam and then carrying the core to the final position thus shaping the batter to the form and size desired.

33. In the art of pastry molding and baking wherein is employed heated molds comprising male and female parts; the method of molding and baking the product which consists in opening the mold cavity by separation of the mold-parts, introducing batter into the cavity, partially introducing the core into the mold cavity and simultaneously closing the mold against the escape of batter while permitting the escape of steam, moving the male member within the female member to distribute the batter and cause it to completely fill the molding cavity, allowing the batter to bake until the article has become finished, then separating the male and female members of the mold and removing the article therefrom.

34. In apparatus of the character stated, a female baking mold having a blind mold cavity and having a throat between the molding cavity proper and the mouth of the mold, a core having a neck of a diameter equal to the greatest diameter of the core and adapted to enter said throat upon the partial introduction of the core into the mold cavity to close the mold cavity against the escape of batter.

LEE C. SHARP.